(12) United States Patent
Raymond et al.

(10) Patent No.: US 6,790,688 B2
(45) Date of Patent: Sep. 14, 2004

(54) METHOD OF HIGH PASS FILTERING A DATA SET

(75) Inventors: Thomas Daniel Raymond, Edgewood, NM (US); Daniel Richard Hamrick, Cedar Crest, NM (US); Daniel Ralph Neal, Tijeras, NM (US)

(73) Assignee: Wavefront Sciences Inc., Albuquerque, NM (US)

( * ) Notice: Subject to any disclaimer, the term of this patent is extended or adjusted under 35 U.S.C. 154(b) by 0 days.

(21) Appl. No.: 10/252,416

(22) Filed: Sep. 24, 2002

(65) Prior Publication Data
US 2003/0046321 A1 Mar. 6, 2003

Related U.S. Application Data

(63) Continuation of application No. PCT/US02/26366, filed on Aug. 20, 2002.
(60) Provisional application No. 60/313,474, filed on Aug. 21, 2001.

(51) Int. Cl.[7] .............................. H01L 21/66; G06K 9/40
(52) U.S. Cl. ........................... 438/16; 382/261; 708/322
(58) Field of Search ........................ 702/140; 708/300, 708/315, 322, 420, 670, 671; 356/237.4, 237.5; 382/254, 261, 263; 438/14, 16

(56) References Cited

U.S. PATENT DOCUMENTS

| | | | | |
|---|---|---|---|---|
| 4,528,639 A | * | 7/1985 | Edwards ..................... | 708/290 |
| 5,129,724 A | * | 7/1992 | Brophy et al. .............. | 356/503 |
| 5,301,108 A | * | 4/1994 | Hsieh ............................ | 378/8 |
| 5,357,372 A | * | 10/1994 | Chen et al. .................. | 359/637 |
| 5,388,909 A | * | 2/1995 | Johnson et al. ............. | 374/161 |
| 5,502,566 A | * | 3/1996 | Ai et al. ...................... | 356/514 |
| 5,764,345 A | * | 6/1998 | Fladd et al. ................ | 356/35.5 |
| 5,790,692 A | * | 8/1998 | Price et al. .................. | 382/133 |
| 6,032,377 A | * | 3/2000 | Ichikawa et al. ............. | 33/554 |
| 6,122,405 A | * | 9/2000 | Khani ........................ | 382/261 |

OTHER PUBLICATIONS

Press et al., "Numerical Recipes", 1986, Cambridge Univ. Press, pp. 417–420, 436–443, and 498–528.*

* cited by examiner

Primary Examiner—Matthew Smith
Assistant Examiner—Lex H. Malsawma
(74) Attorney, Agent, or Firm—Volentine Francos, PLLC

(57) ABSTRACT

An improved method of high pass filtering a data set includes flattening the data set and then filtering the flattened data set with an adaptive filter. The data set is flattened by fitting it to a predetermined function, and then obtaining the difference between the original data set and the fitted data set. Beneficially, the predetermined function is a polynomial. The adaptive filter includes a masking function that has a constant, non-zero value (e.g., 1) within the bounds of the original data set and value of zero outside the bounds of the original data set.

15 Claims, 4 Drawing Sheets

METHOD OF HIGH PASS FILTERING A DATA SET

CROSS REFERENCE TO RELATED APPLICATIONS

This is a continuation application claiming the priority benefit under 35 U.S.C. § 119 of International Application Serial No. PCT/US02/26366 filed on Aug. 20, 2002, under 35 U.S.C. § 119, and U.S. Provisional Patent Application No. 60/313,474 filed on Aug. 21, 2001, the entirety of each of which is hereby incorporated by reference for all purposes as if fully set forth herein.

BACKGROUND AND SUMMARY

1. Field

This invention pertains to the field of digital signal processing and, more particularly, to a method of high-pass filtering a digital data set.

2. Description

Data filtering is a widely used method of processing a data set to suppress noise and/or other unwanted signal components to reveal or transmit only the desired data. There exist a vast number of methods of data filtering that are well described in many texts on signal processing. Digital signal processing has grown vastly in the last few decades because of the ready availability of Digital Signal Processors (DSPs) and small fast computers. Indeed the use of digital signals is ubiquitous in audio compact disks.

Data filtering in the real world always contends with finite data sets and extraction of signals from the data sets near the set boundaries is problematic. Whether one uses convolution techniques or transform techniques, if the data terminates abruptly, the discontinuity will lead to the formation of artifacts that can corrupt the desired signals. Generally one attempts to collect data over an interval sufficiently large that the signal levels either decay to a constant value, or are periodic, or the data is windowed using an apodization method.

Unfortunately there exist situations where such acquisition or window techniques cannot be applied.

One example of such a situation is the nanotopographic measurement of substrates, such as semiconductor wafers, glass substrates of liquid crystal display (LCD) panels, etc. In this application, the data set is two-dimensional and has a fixed boundary where a relatively large discontinuity exists and cannot be avoided. The data set is the height, or height variation, across the wafer surface up to the wafer edge. The desired signal consists of typically small amplitude variations of a few nanometers composed of spatial frequencies in the range of approximately 1 $mm^{-1}$ to 0.05 $mm^{-1}$. As is well known, frequency and wavelength are reciprocally related. As the work presented here is motivated by application to filtering of spatial rather than time domain signals, wavelengths are used throughout this specification. That said, the signals of interest contain spatial wavelengths of order 1 to 20 mm. The wafers are hundreds of micrometers thick, hence the edge of the wafer presents a large discontinuity compared to the desired signal. To further complicate the situation, the desired signal rides upon signals of much larger amplitude (tens of micrometers) composed of wavelengths longer than 20 mm. (These signals may reflect large-scale "waves" in the overall surface of the wafer due to the wafer manufacturing process).

The challenge is to filter the measured amplitude data to retrieve the desired nanotopographic data, without introducing artifacts of the filtering process as discussed above.

Traditional filter techniques fail to produce accurate filtered data near the wafer edge because of these filtering artifacts. FIG. 1 illustrates a height-variation plot for a silicon wafer where z=0 is defined to be the average height of the surface. While normalizing for the average height does reduce the discontinuity from hundreds of micrometers, it remains at several micrometers at best, for typical wafers.

FIG. 2 shows the result of applying a traditional high pass filter to the data of FIG. 1, the filter consisting of a two dimensional convolution with a Gaussian kernel of σ=5 mm and a square support 20 mm on the side. While the center of the wafer now reveals the desired nanotopographic data previously masked by the long wavelength data having much greater amplitude variations, the remaining edge discontinuity has corrupted the data near the wafer edge. The colored regions on the map indicate areas where the filtered height exceeded the range from −100 to +100 nm. The effect of the wafer edge begins to distort the filtered data within about 10 mm of the edge of the wafer.

The reason the traditional method fails is that it requires data outside the data bounds in order to calculate the filtered result near the data boundary. This data is often, as in this illustration, simply zeros inserted for convenience. Alternately, one could try to extrapolate the data from within the data boundary, or perhaps use a Gershberg type algorithm to create the data. In any event, the data outside the original data bounds is created, not real.

For example, assume the data is simply zero-padded outside the original bounds. A standard high pass convolution filter is obtained by taking the difference between the original data and data that has been low pass filtered. In the area of nanotopography of silicon wafers, a common low pass filter employed is a simple convolution with a fixed kernel, e.g., a Gaussian kernel. The convolution is often denoted by:

$$f(x) \otimes g = \int f(x-\tau)g(x)dx = \int f(x)g(x-\tau)dx \quad\quad 1$$

where in this case, f denotes the wafer surface data, and g the filter kernel.

Note that the convolution is symmetric in f and g. Often g is assumed to be a fixed function that is normalized to unity:

$$1 = \int g(x)dx \quad\quad 2$$

The above equations illustrate the convolution in a single dimension, but extension to two dimensions is straightforward. Ideally the bounds of the integral are over all space, but practically, the bounds are finite and determined by the data set and the width of the kernel. Applying this function near the original data boundaries necessarily implies including points outside the original data boundary. When the data is zero-padded, the result of this operation is a value that can be systematically lower or higher than the data well within the data bounds depending on whether the data within the bounds was on average greater or less than zero, respectively. If the discontinuity at the data boundary is large compared to the features of interest, this systematic trend will corrupt the desired data.

Accordingly, it would be advantageous to provide an improved method of high-pass filtering a data set. It would also be advantageous to provide such an improved method that handles discontinuities at the data set boundary with reduced artifacts. Other and further objects and advantages will appear hereinafter.

The present invention comprises an improved method of high pass filtering a finite data set. The method has many applications, but is particularly applicable to image processing and to nanotopographic measurements of substrates, such as semiconductor or glass substrates.

In one aspect of the invention, a method of high pass filtering an input data set comprises flattening the input data set; and adaptive filtering the flattened data set.

In another aspect of the invention, a method of high pass filtering an input data set comprises fitting the input data set to a preset function to produce a fitted data set; obtaining a difference between the input data set and the fitted data set to produce a flattened data set; adaptive filtering the flattened data set; and masking the adaptive filtered data set by a masking function that is a fixed non-zero value when the adaptive filtered data corresponds to a location in the measured data set and is zero when the adaptive filtered data corresponds to a location outside the measured data set.

In yet another aspect of the invention, a method of obtaining nanotopographic data for a substrate, comprises measuring a height profile across an entire surface of the substrate to obtain a measured data set; fitting the measured data set to a preset function and producing a flattened data set by taking a difference between the measured data set and the fitted data set; adaptive filtering the flattened data set to produce an adaptive filtered data set; and multiplying the adaptive filtered data set by a masking function that is a fixed non-zero value when the adaptive filtered data corresponds to a location within the measured data set and is zero when the adaptive filtered data corresponds to a location outside the measured data set.

DETAILED DESCRIPTION

Figure 6:
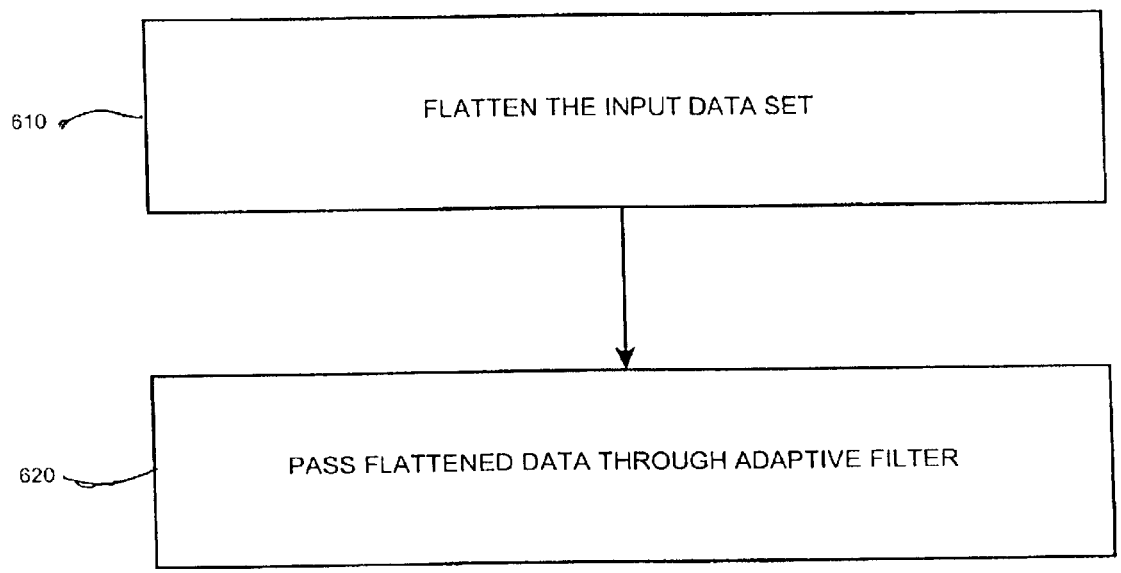
FIG. 6 is a flowchart illustrating a method 600 of high pass filtering a data set.

FIG. 6 is a flowchart illustrating a method 600 of high pass filtering a data set. The method 600 is a two-step process.

In a first step 610, the data set is "flattened." First, a slowly varying function is fit to the measured data set. Then, the fitted data set (data points obtained from the function) are subtracted from the measured data set (or vice versa) to produce a flattened data set. Beneficially, the slowly varying function is fit to the measured data by employing a least squares fit algorithm. This "flattening" step 610 leaves the high frequency content untouched while reducing the discontinuity at the data edge. The difference between the measured data and the "fit function" is set to zero outside the original data boundaries.

Then, in a second step 620, the resultant flattened data set from step 610 is filtered using an adaptive normalized convolution filter, as described in more detail below.

Flattening

In the step 610, the measured data set is fit to a predetermined, slowly varying, function. The concept is to fit the data to a function whose frequency content is dominated by frequencies that will be attenuated in a subsequent step.

For the case of nanotopographic measurement of semiconductor or glass wafers, as discussed above, a polynomial of order 7 to 11 is beneficially employed. A $9^{th}$ order polynomial will contain frequencies up to about 9 times the lowest frequency supported by the wafer, i.e., 9/D for a wafer of diameter D. Only the available measured data is fit to the polynomial, without any assumptions about data values outside the original data bounds. Hence, the fit function represents the low frequency content of the wafer shape all the way to the edge of the wafer.

Most beneficially, for filtering data obtained from 200 mm semiconductor wafers, an $11^{th}$ order polynomial is employed. The choice of the polynomial order is made according to the degree of suppression of the long wavelength features desired. In effect, the order of the polynomial and the dimension over which it is fit, determine the cut off wavelength of the flattener. A rule of thumb for the determination of the polynomial order is that:

$$N \leq D/\lambda \qquad 3$$

where N is the polynomial order, D is the domain of the data, and λ is the desired cut off wavelength of the high pass filter.

This selection ensures that the flattening step 610 does not suppress features comprised of wavelengths shorter than λ, but does suppress features comprised of wavelengths longer than λ.

Figure 1:
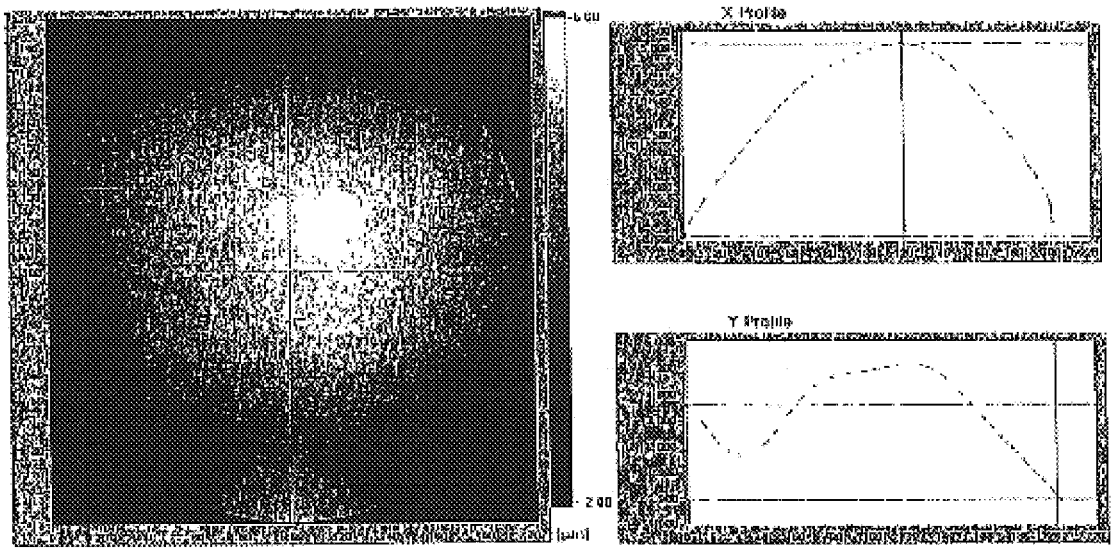
FIG. 1 illustrates a height-variation plot for a silicon wafer.
Figure 2:
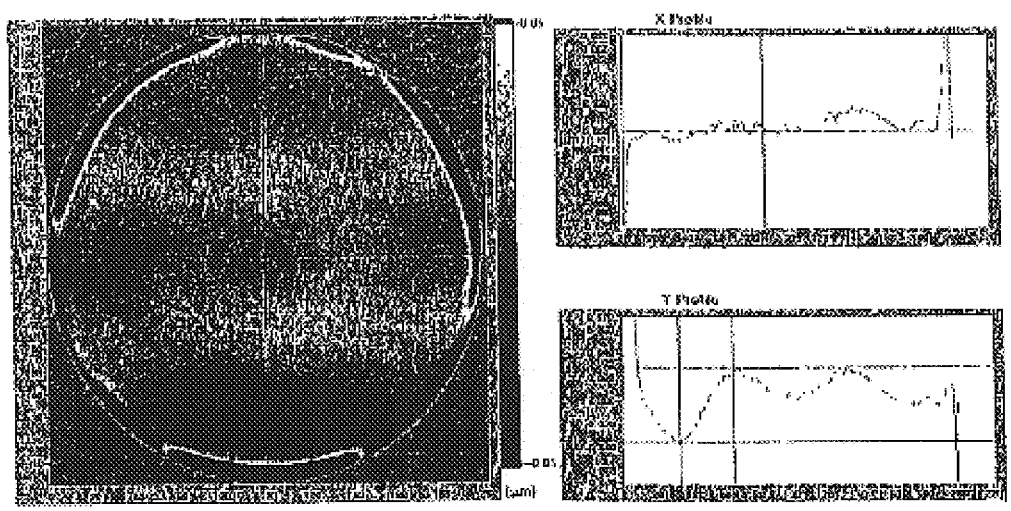
FIG. 2 illustrates the result of applying a traditional high pass filter to the data of FIG. 1.
Figure 3:
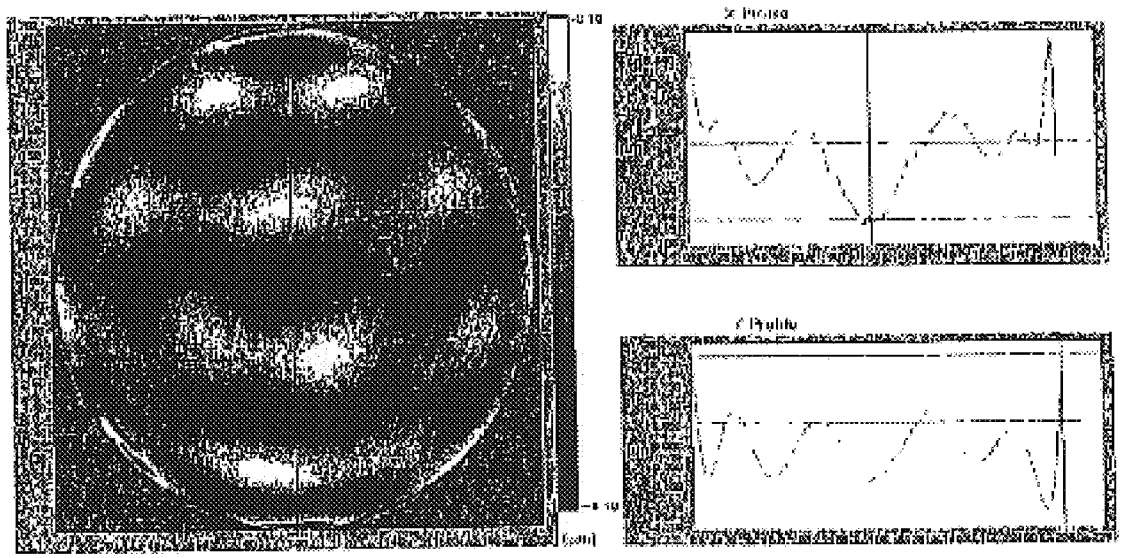
FIG. 3 illustrates the result of flattening the measured data shown in FIG. 1.

FIG. 3 illustrates the result of flattening the measured data shown in FIG. 1 using the procedure described above. The flattened data begins to reveal the nanotopographic features, but also shows a much smaller discontinuity at the edge and no apparent distortion at the wafer edge. The polynomial used for this example is a $9^{th}$ order polynomial.

Adaptive Filtering

In a step 620, the flattened data set is passed through an adaptive convolution filter. The filter is designed to allow g to adapt as it approaches the wafer edge. Adaptive filter kernels are not new to the filtering community, and are often applied in image processing. In those cases, the kernel may be adapted by masking it as it approaches a feature.

However, the disclosed method is far superior to previous methods in that no assumptions about the data outside the data bounds are required. Here, as the kernel approaches the wafer edge, it is allowed to go to zero outside the wafer boundary.

If the data were already zero padded, a constant kernel could be employed to achieve the exact same result. The problem with this simple approach is that the kernel is not constant and the assumption that it is normalized is not valid for all results of the convolution. Therefore if the data was zero padded, the effective area under g would actually diminish, hence the convolution value that would be obtained would be too small.

This problem is addressed by defining a normalized convolution as follows:

$$\overline{f \otimes g} \equiv \frac{\int_{M \neq 0} f(x-\tau)g(x)dx}{\int_{M \neq 0} g(x)dx} = \frac{\int_{M \neq 0} f(x)g(x-\tau)dx}{\int_{M \neq 0} g(x)dx} M(\tau) \qquad 4)$$

where M is a masking function that is that is a fixed non-zero value (e.g., 1) when the adaptive filtered data corresponds to a location within the original measured data set, and is 0 when the adaptive filtered data corresponds to a location outside the original measured data set.

This definition is equal to the traditional convolution filter for all points well within the data bounds of the original data set, but it differs near the data boundary. Indeed, if the data were initially zero padded, the numerator is exactly equal to the traditional convolution filter previously described. The difference is then primarily in the normalization. Note that the multiplicative factor M in the definition prevents singularities.

One drawback of using this approach is that the cutoff frequency of the filter becomes dependent on the position in the data set. This is because the kernel support is position dependent and the cutoff frequency is weakly dependent on the kernel support. In the case of filtering data for nanotopography, the low frequency cutoff increases by as much as a factor of two. Fortunately, in the nanotopography application, this increased transmission at low frequencies is not as important an issue as extracting the high frequency data.

The adaptive filter could be implemented as a true high pass filter, or by low-pass filtering the flattened data set and then subtracting the low pass filtered data set from the flattened data set input to the adaptive filter.

Figure 4:
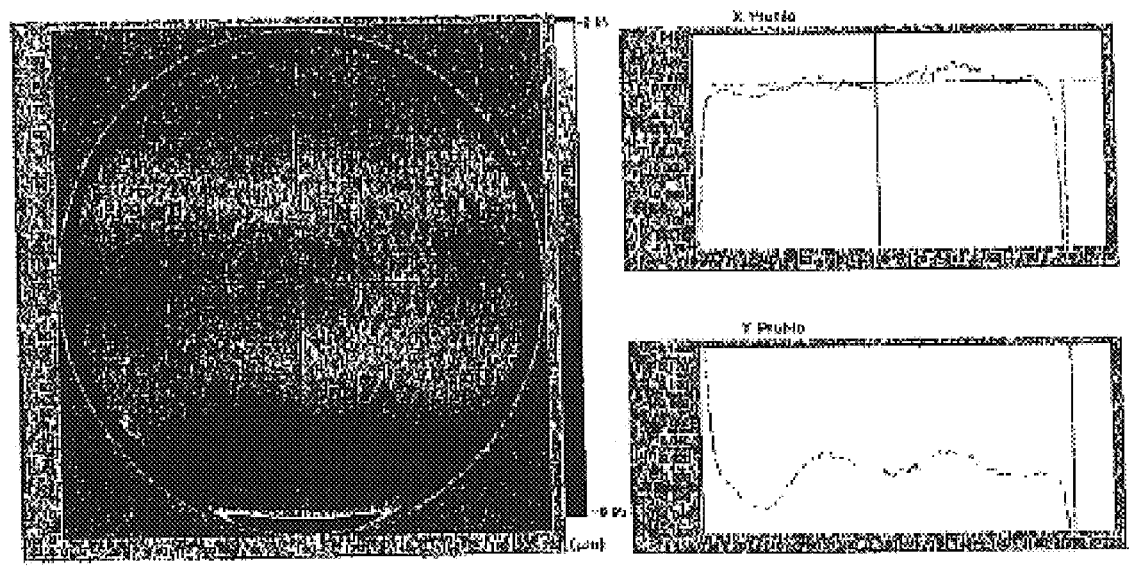
FIG. 4 illustrates the result of applying an adaptive filter to the measured data shown in FIG. 1.

FIG. 4 illustrates the result of applying an adaptive filter to the unflattened measured data shown in FIG. 1. One can see an improvement over the traditional filter, but the filtered data near the edge is still affected by the discontinuity.

Figure 5:
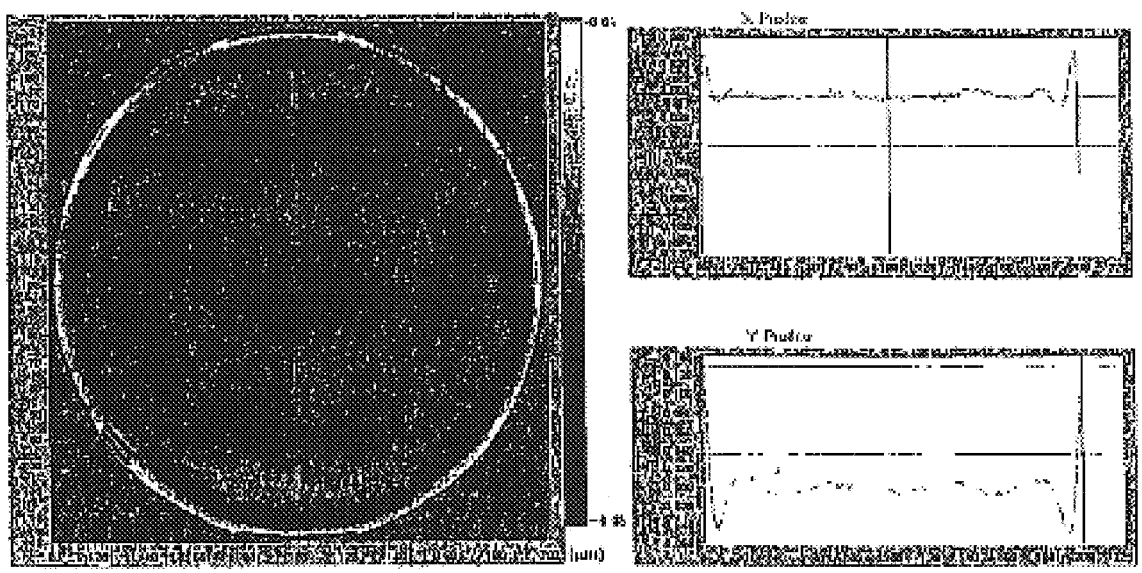
FIG. 5 illustrates the result of flattening and then adaptive filtering the measured data shown in FIG. 1.

FIG. 5 illustrates the result of applying the two-step process 600 (flattening with $9^{th}$ order polynomial followed by adaptive filtering) to the measured data shown in FIG. 1. The result clearly shows the desired high frequency detail all the way to the wafer edge. Indeed, flattening the data improves the long wavelength features in the interior of the wafer as well.

The filtering method described herein has clear advantages over traditional filtering methods when the available data do not trend to zero naturally. No windowing of the data is required nor is any assumption about the data trend. All of the available data is used, and no data is fabricated. The disclosed method improves over standard convolution and Fourier techniques in that it handles data near the data boundary optimally without making assumptions about the data itself. All that is required to optimize the filter is the selection of the desired cut off wavelength. With this selection, the order of the polynomial used in the flattening step and the cut off wavelength of the adaptive filter kernel are determined. This filtering method has advantages over the traditional methods because of its improved treatment of the data near the data boundary.

The method described herein takes advantage of increased computational capabilities in today's electronics and rides on the trend toward increased digital signal processing. This technique is obviously applicable to wafer topography and image processing as described above, but also has wide application to analysis of one-dimensional data, e.g., RADAR, coherent LIDAR and audio signals.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method of obtaining nanotopographic data for a substrate, comprising:

measuring a height profile across an entire surface of the substrate to obtain a measured data set; and high pass filtering the measured data set, said high pass filtering comprising, fitting the measured data set to a preset function and producing a flattened data set by taking a difference between the measured data set and the fitted data set, adaptive filtering the flattened data set to produce an adaptive filtered data set, and multiplying the adaptive filtered data set by a masking function that is a fixed non-zero value when the adaptive filtered data corresponds to a location within the measured data set and is zero when the adaptive filtered data corresponds to a location outside the measured data set.

2. The method of claim 1 wherein the substrate is one of a semiconductor substrate and a glass substrate.

3. The method of claim 1, wherein the preset function is a polynomial function.

4. The method of claim 3, wherein the polynomial function has a polynomial order between 9 and 11.

5. The method of claim 1, wherein adaptive filtering the flattened data set comprises high pass filtering the flattened data set.

6. The method of claim 1, wherein the measured data set is fitted to the preset function with a least squares fit algorithm.

7. The method of claim 1, wherein adaptive filtering the flattened data set comprises low pass filtering the flattened data set and subtracting the low pass filtered data set from the flattened data set.

8. The method of claim 1, further comprising normalizing the adaptive filtered data with respect to a kernel of an adaptive filter employed to adaptive filter the data.

9. A method of high pass filtering an input data set, comprising:

fitting the input data set to a preset function to produce a fitted data set;

obtaining a difference between the input data set and the fitted data set to produce a flattened data set;

adaptive filtering the flattened data set; and masking the adaptive filtered data set by a masking function that is a fixed non-zero value when the adaptive filtered data corresponds to a location in the input data set and is zero when the adaptive filtered data corresponds to a location outside the input data set.

10. The method of claim 9, wherein the preset function is a polynomial function.

11. The method of claim 9, wherein the polynomial function has a polynomial order between 9 and 11.

12. The method of claim 9, wherein the input data set is fitted to the preset function with a least squares fit algorithm.

13. The method of claim 9, wherein adaptive filtering the flattened data set comprises high pass filtering the flattened data set.

14. The method of claim 9, wherein adaptive filtering the flattened data set comprises low pass filtering the flattened data set and subtracting the low pass filtered data set from the flattened data set.

15. The method of claim 9, further comprising normalizing the adaptive filtered data with respect to a kernel of an adaptive filter employed to adaptive filter the data.

* * * * *